Sept. 20, 1949.  H. BECCHIA  2,482,235
CENTRIFUGAL HOMOGENIZER
Filed July 13, 1946
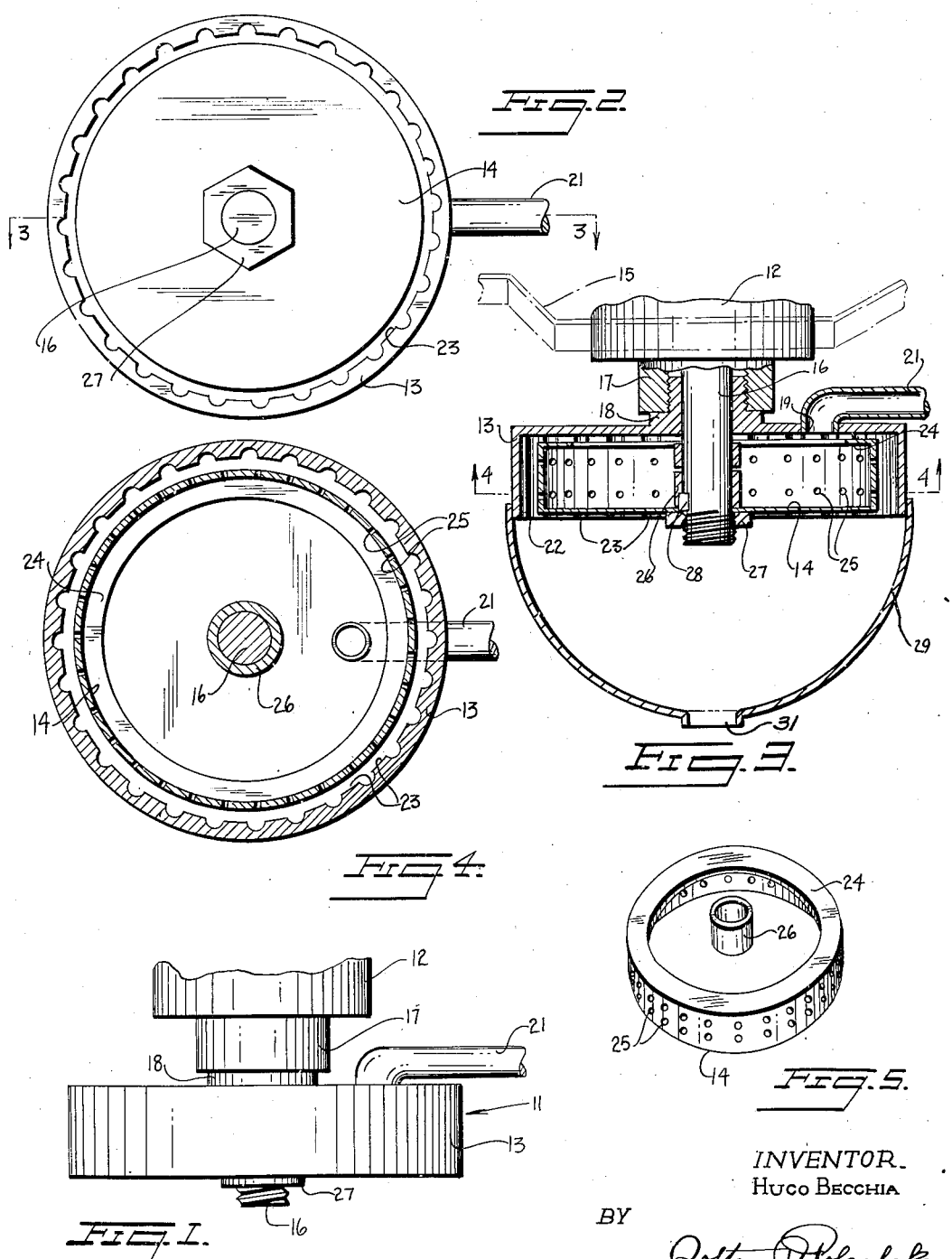
INVENTOR.
Hugo Becchia
BY
ATTORNEY Patented Sept. 20, 1949

2,482,235

UNITED STATES PATENT OFFICE 2,482,235

CENTRIFUGAL HOMOGENIZER

Hugo Becchia, New York, N. Y.

Application July 13, 1946, Serial No. 683,360

2 Claims. (Cl. 259—50)

This invention relates to homogenizers and more particularly to a homegenizer operable by centrifugal action.

It is an object of the present invention to provide a homogenizer which is of simple construction and which can be supported in a simple manner to a wall bracket.

It is another object of the invention to provide a homogenizer by which the full benefit of centrifugal action may be had and wherein the enclosing drum will be provided with serrations aligned and arranged to enhance the effectiveness of the homogenizer.

It is another object of the present invention to provide a homogenizer which has a small number of parts and which can be easily assembled to the motor shaft and disassembled at times when it is desired to clean the apparatus.

According to the present invention, a motor is arranged so that its armature extends in a vertical direction and its driving shaft depends therefrom. In this position, the motor may be connected to a bracket carried on a wall surface. Upon the driving shaft there is connected an external drum having serrations in its inner face and an internal drum connected to the shaft to be driven thereby to rotate with terrific speed within the external drum. The external drum is closed at the top except for the admittance, by means of a pipe, of liquid or fat to be homogenized while the internal drum is closed at the bottom and open at the top to receive the liquid or fat from the inlet pipe in the external drum. In the outer wall of the internal drum, there are holes through which the liquid is flung to the serrated internal surface of the external drum. On engaging the serrated surface, the fat particles are broken up and dropped downwardly through the open bottom end of the external drum into a bowl or funnel which can be easily attached to the exterior surface of the external drum.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a side elevational view of the homogenizer embodying the features of the present invention but with the collecting bowl removed.

Fig. 2 is a bottom plan view of Fig. 1.

Fig. 3 is a vertical cross sectional view taken on the line 3—3 of Fig. 2, but with the collecting bowl in position.

Fig. 4 is a transverse horizontal cross sectional view taken on the line 4—4 of Fig. 3.

Fig. 5 is a perspective view of the interior drum separated from the device, looking into the open top thereof.

The centrifugal homogenizer, according to the present invention, includes a homogenizer unit 11 and a motor 12 for operating the homogenizer unit 11. The homogenizer unit 11 comprises an external drum 13 secured and supported on the casing of the motor 12 against rotation and an internal drum 14 for rotation within the external drum 13. The motor 12 is connected to a wall by means of a bracket 15 so that its driving shaft 16 extends in a vertical direction and upon which the internal drum 14 is mounted to rotate in a horizontal plane.

On the lower end of the motor 12 is an internally threaded portion 17 adapted to receive an externally threaded projection 18 of the external drum 13. When the projection 18 on the external drum 13 is screwed into place within the internally threaded portion 17, the drum 13 will be retained in place on the bottom of the motor and against rotation. The top of the drum 13 is closed except for an opening 19 adapted to receive an inlet pipe 21 through which the liquid or fat to be homogenized is delivered to the homogenizer. The external drum 13 has an open bottom 22, and has the inner surface of its peripheral wall formed with a plurality of circumferentially spaced serrations 23 against which the liquid is thrust under centrifugal action and by means of which the fat or liquid particles are broken up into small particles thereby to effect a homogenizing action upon them.

The internal drum 14 is closed at the bottom and open at the top except for a small radially inwardly extending flange 24. Through the open top of the drum 14, the fluid from the pipe 21 is admitted. The outer peripherial of the drum 14 has a plurality of circumferentially spaced apertures 25 through which the fluid is forced as the drum 14 is turned at high speed to effect the homogenizing action of the fluid when contacting the serrations 23.

Extending up from the bottom of the internal drum 14 is a hub 24 adapted to fit over the driven shaft 16 of the motor 12 to be secured thereon by a thrust nut 27 fastened on the threaded outer end of the shaft 16. In order to provide a driving relationship between the shaft 16 and the hub 26, there is provided a key connection 28 between the lower end of the hub 26 and the shaft 16.

To the bottom of the external drum 13 there may be connected by frictional engagement with the exterior surface of the external drum, a bowl 29 to collect the homogenized liquid descending from the open bottom 22 of the external drum 13. In the bottom end of the bowl 29 there is an outlet 31 through which the liquid is taken from the bowl or funnel 29 and delivered to any suitable container.

When the internal drum is rapidly rotated by the motor, which also supports this drum, and milk is supplied through the feed conduit 19, the centrifugal action of the drum will impart a spinning motion to the milk, which will be forced through the small perforations in the outer wall of the drum, and the overlying flange 24 will aid in preventing vertical displacement of the stream of milk forced through the holes 25 of the drum wall.

The outward flow of the milk through the small holes 25 will subject the globules of milk to a squeezing action, and this will homogenize the milk so that the fat or cream particles will be combined with the fluid particles against gravity separation into two layers of different specific gravity.

It should now be apparent that there has been constructed a homogenizer operable by centrifugal action which consumes minimum space, is efficient in operation, requires few parts and these parts are so constructed that they can be easily assembled together or disassembled for the purpose of washing or cleaning. It should be further apparent that the device is such that it can be supported directly from the driving motor housing and is readily attachable to or detachable from the same.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a homogenizer having a motor formed with a depending driven shaft, a homogenizer unit comprising an external drum fixedly mounted on the casing of the motor and having a flat top wall, a depending skirt wall and an open bottom, an internal drum concentrically positioned within said external drum and mounted on the driven shaft to be rapidly rotated thereby, said internal drum having a flat bottom wall, a cylindrical skirt wall and a top inwardly extended flange defining a top opening for said internal drum, said top wall of said external drum having an opening above the top opening of said internal drum through which a liquid to be homogenized may be passed into said internal drum, said internal drum having its skirt wall formed with a plurality of small perforations, and a plurality of vertically arranged serrations formed on the inner face of said skirt wall of said external drum, whereby when said internal drum rotates the liquid to be homogenized will be centrifugally thrown through said perforations in small droplets and impinged against said serrations to have the fat content broken up and then fall completely homogenized from the open bottom of said external drum.

2. In a homogenizer having a motor formed with a depending driven shaft, a homogenizer unit comprising an external drum fixedly mounted on the casing of the motor and having a flat top wall, a depending skirt wall and an open bottom, an internal drum concentrically positioned within said external drum and mounted on the driven shaft to be rapidly rotated thereby, said internal drum having a flat bottom wall, a cylindrical skirt wall and a top inwardly extended flange defining a top opening for said internal drum, said top wall of said external drum having an opening above the top opening of said internal drum through which a liquid to be homogenized may be passed into said internal drum, said internal drum having its skirt wall formed with a plurality of small perforations, and a plurality of vertically arranged serrations formed on the inner face of said skirt wall of said external drum, whereby when said internal drum rotates, the liquid to be homogenized will be centrifugally thrown through said perforations in small droplets and impinged against said serrations to have the fat content broken up and then fall completely homogenized from the open bottom of said external drum, and a bowl fitted over the open bottom of said external drum for catching the homogenized liquid which drops from said open bottom.

HUGO BECCHIA.

REFERENCES CITED

The following references are of record in the file of this patent:

UNITED STATES PATENTS

| Number | Name | Date |
|---|---|---|
| 946,175 | Walton | Jan. 11, 1910 |
| 1,212,831 | Spelman | Jan. 16, 1917 |
| 1,557,585 | Hele-Shaw | Oct. 20, 1925 |
| 1,742,643 | Boehn | Jan. 7, 1930 |
| 1,886,954 | Hope | Nov. 8, 1932 |
| 1,965,905 | Parker | July 10, 1934 |
| 1,988,612 | Stindt | Jan. 22, 1935 |
| 2,090,373 | Neuman | Aug. 17, 1937 |